Feb. 25, 1958     C. G. GIBSON     2,824,332

WINDSHIELD WIPER DRIVE MECHANISM

Filed Aug. 3, 1955

INVENTOR.
CHARLES G. GIBSON
BY
Craig V. Morton
ATTORNEY

United States Patent Office 2,824,332
Patented Feb. 25, 1958

2,824,332

WINDSHIELD WIPER DRIVE MECHANISM

Charles G. Gibson, Flint, Mich., assignor to General Motors Corporation, Detroit, Mich., a corporation of Delaware Application August 3, 1955, Serial No. 526,295

4 Claims. (Cl. 15—253)

This invention pertains to windshield cleaning apparatus, and particularly to drive mechanism between wiper motor and a wiper transmission assembly.

Heretofore, it has been found necessary to devise flexible drive mechanism between a wiper motor and a pair of spaced wiper transmission assemblies due to the configuration of some modern vehicles. Conventional flexible drive mechanism comprises either an endless flexible cable or a plurality of lengths of flexible cable which interconnect and are supported by pulley assemblies. However, all of the previous flexible cable drives require tensioning means, either of the manual or automatic type, for maintaining the cables taut, since motion is transmitted only by pulling on the cables. The present invention relates to a novel flexible cable drive wherein the necessity of tensioning devices and the problem attendant therewith are eliminated, and wherein motion can be transmitted by pushing and pulling the cable. Accordingly, among my objects are the provision of flexible drive means for interconnecting a wiper motor and a wiper transmission assembly; the further provision of self-supporting flexible drive mechanism for windshield wipers; and the still further provision of a windshield wiper assembly wherein the wiper motor may be connected directly to one wiper transmission assembly or connected to an intermediate point of the drive means.

The aforementioned and other objects are accomplished in the present invention by utilizing a self-supporting helically wound flexible cable as the drive means. Specifically, the self-supporting cable constitutes a flexible rack, adjacent convolutions of the wire cable being in at least partial engagement with each other at all times. Each wiper transmission assembly comprises a stationary housing within which an oscillatable shaft is journaled. One end of the transmission shaft is drivingly connected to a wiper arm, and the other end has attached thereto a wheel having a fluted periphery, constituting a pinion gear. The wheel has arcuate flutes for drivingly engaging each convolution of the flexible cable.

Each transmission assembly also includes a U-shaped member having oppositely extending channel portions for guiding the drive cable. The channeled portions of this member have an arcuate liner of any suitable plastic, such as nylon, constituting a self-lubricating bearing for guiding the drive cable. The legs of the U-shaped member have aligned openings through which the transmission shaft extends, the legs thereof being disposed on opposite sides of the hobbed wheel and suitably connected to the transmission housing.

In one embodiment, a wiper motor having an oscillatory output shaft is drivingly connected to one of the transmission shafts. In this embodiment, the drive cable merely transmits the motion from one transmission shaft to the other transmission shaft through the hobbed wheels thereon. In another embodiment, the wiper motor is drivingly connected to a third hobbed wheel supported in a bracket located between the spaced wiper transmission assemblies, and the cable drive is employed to effect asymmetrical oscillation of the spaced wiper assemblies.

Further objects and advantages of the present invention will be apparent from the following description, reference being had to the accompanying drawing wherein preferred embodiments of the present invention are clearly shown.

Figure 1:
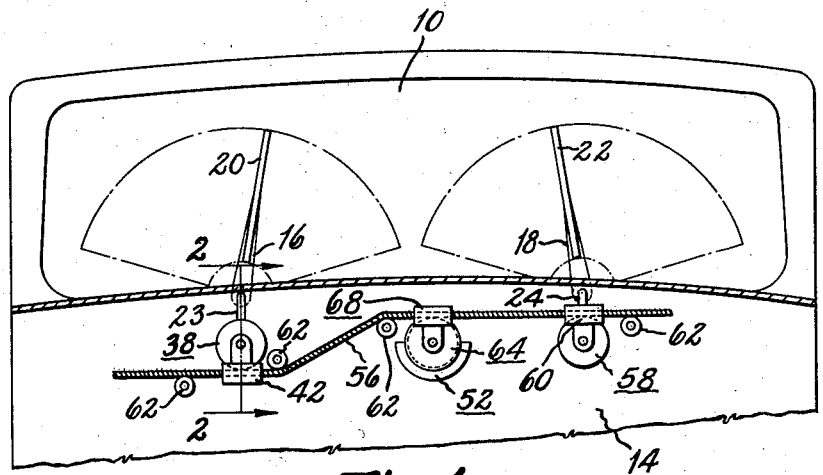
Fig. 1 is a fragmentary view, partly in section and partly in elevation, of a vehicle equipped with cleaning apparatus including the drive mechanism of one embodiment of this invention.
Figure 2:
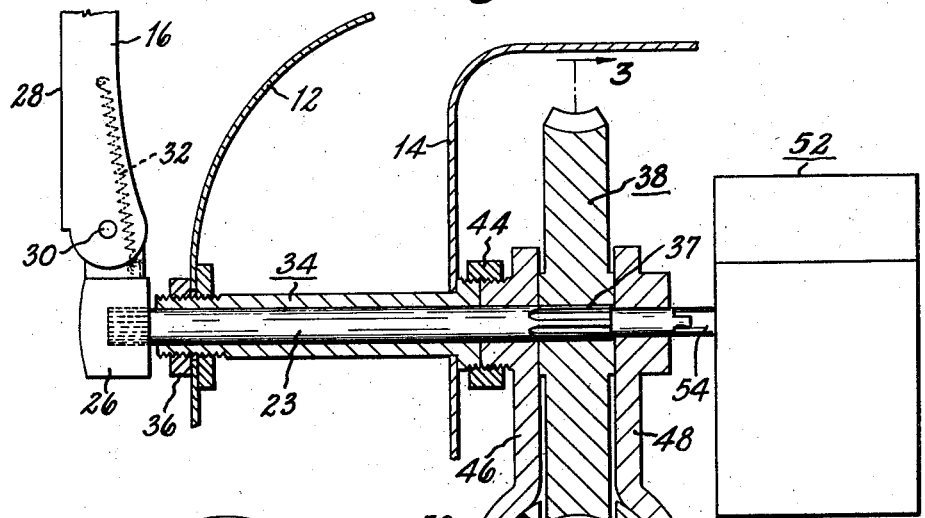
Fig. 2 is an enlarged fragmentary sectional view taken along line 2—2 of Fig. 1 and illustrating another embodiment.

With particular reference to Figs. 1 and 2, a vehicle is shown having a windshield 10, a cowl 12 and a firewall 14. In accordance with conventional practice, the cleaning apparatus for the vehicle windshield 10 comprises a pair of oscillatable wiper arms 16 and 18, which are detachably connected to wiper blades 20 and 22, respectively. The arms 16 and 18 are drivingly connected with a pair of spaced transmission shafts 23 and 24, respectively, which are oscillated by motor means, to be described, so as to impart simultaneous asymmetrical oscillation to the spaced windshield wiper assemblies including arms 16, 18, and blades 20, 22, as indicated in Fig. 1.

With particular reference to Fig. 2, the wiper arms 16 and 18 are of identical construction, and include an inner socket section 26 and an outer blade carrying section 28, which are interconnected by a transversely extending pin 30, as well as a spring 32 for applying wiping pressure to the blades carried thereby. Likewise, the transmission shaft assemblies for the spaced wiper assemblies are of identical construction and, hence, only one will be described in detail. The transmission shaft 22 is rotatably journaled in a stationary housing 34, which projects through an aperture in the cowl 12, the housing 34 being attached to the vehicle by means of a nut 36. The housing 34 also extends through an aperture in the firewall 14, and has attached thereto by any suitable means, such as spline teeth 37, wheel 38.

Figure 3:
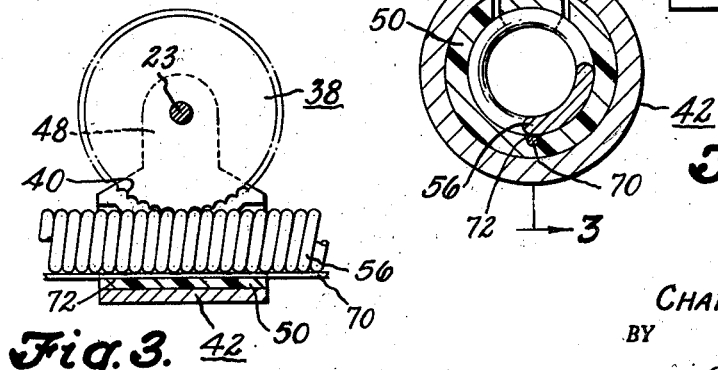
Fig. 3 is a view, partly in section and partly in elevation, taken along line 3—3 of Fig. 2 and illustrating features common to both embodiments.

As seen particularly in Fig. 3, the wheel 38 has a fluted periphery, as indicated by numeral 40. That is, the periphery of the wheel 38 comprises a plurality of contiguous semi-circular grooves, the edges of which constitute teeth so that the wheel 38 functions as a pinion gear.

A U-shaped member, or bracket, 42 is attached to the transmission housing 34 by means of a nut 44. The legs 46 and 48 of the bracket 42 straddle the fluted wheel 38 and have aligned openings therein through which the transmission shaft 23 extends. The bottom of the bracket 42 includes oppositely extending channel portions within which an arcuate liner 50 of any suitable plastic, such as nylon, is disposed.

In the first embodiment shown in Fig. 2, a windshield wiper motor 52, which may be of the vacuum, hydraulic or electric type, having an oscillatory output shaft 54, is shown drivingly connected to the transmission shaft 23. Thus, oscillation of the motor shaft 54 will impart oscillation to the shaft 23 and the wiper arm 16 connected thereto. At the same time, oscillation will be imparted to the wheel 38. The fluted periphery of the wheel 38 engages a self-supporting, helically wound flexible wire cable 56, which constitutes a flexible rack. The fluted wheel 38 imparts rectilinear reciprocating movement to the cable 56 upon oscillation of the motor drive shaft 54. As seen in Fig. 3, adjacent convolutions of the cable 56 are in engagement so that each convolution engages a semi-circular recess in the wheel 38. In this embodiment, the drive cable 56 is guided for movement within the bracket 42, and is drivingly connected to a fluted wheel 58, which is connected to the transmission shaft 24. In this manner, upon operation of the motor 52, the blades 20 and 22 will have imparted thereto asymmetrical oscillation, since the cable 56 engages the bottom of wheel 38 and the top of wheel 58. The cable 56 is guided in a U-shaped bracket 60, identical to the bracket 42 aforedescribed. In some instances, it may be desirable to provide guide rollers, such as indicated by numeral 62, which are attached to the firewall 14 so as to locate the drive cable 56 in the vehicle installation.

It should be noted that the drive cable 56 is self-supporting in that no internal core member is required. This feature is accomplished by having adjacent convolutions of the wire cable in contiguous relationship. Moreover, the cable 56, by reason of its construction will effectively withstand longitudinal distention, and due to the positive driving connection with the fluted wheels does not require any tensioning devices. In other words, the cable 56 is substantially longitudinally rigid and does not extend, or stretch, under the tension load to which it is subjected in the mechanism shown, namely, a windshield wiper actuating mechanism.

Referring again to Fig. 1, a second embodiment is disclosed wherein the wiper motor 52 is drivingly connected to a third fluted wheel 64, carried by a U-shaped bracket 68 identical to the aforedescribed bracket 42. In this embodiment, the motor 52 is suitably connected to the firewall 14, and imparts oscillatory motion to the fluted wheel 64. Oscillatory motion of the fluted wheel 64 is converted into reciprocation of the cable 56 due to the driving connection therebetween, and reciprocation of the cable 56 imparts asymmetrical movement to the wiper blades 20 and 22 through fluted wheels 38, 58, transmission shafts 23, 24, and arms 16, 18.

In embodiments, to prevent undesirable rotation of the cable 56 about its longitudinal axis, the cable has attached thereto by any suitable means, such as welding, a longitudinally extending pin 70 adjacent each hobbed wheel. In particular, as shown in Figs. 2 and 3, the plastic liner 50 has a longitudinally extending groove 72 therein, which receives the guide pin 70. The guide pins 70 need only be of a length equal to the reciprocatory stroke of the cable 56.

From the foregoing, it is apparent that the present invention provides an improved flexible cable drive which obviates the necessity of tensioning devices. Moreover, the cable drive possesses all of the advantages of previous flexible cable drives inasmuch as it can conveniently be deformed to transmit motion around corners, as is necessary in some vehicle installations.

While the embodiments of the present invention as herein disclosed, constitutes preferred forms, it is to be understood that other forms might be adopted.

What is claimed is as follows:

1. In a vehicle having a windshield, a wiper actuating shaft journalled at the lower side of the windshield, an oscillatory drive shaft, a first fluted wheel connected to the drive shaft, a non extensible, laterally flexible cable comprising a helically wound wire having adjacent convolutions in engagement with each other, said cable engaging said first fluted wheel so as to be reciprocated thereby in a rectilinear path, a second fluted wheel attached to the wiper shaft, said cable engaging said second fluted wheel to rock said wiper shaft, and means for preventing rotation of said cable about its longitudinal axis.

2. The combination set forth in claim 1 wherein each fluted wheel has associated therewith a bracket for guiding the movement of said cable, and wherein said last recited means comprises a pin attached to the outer periphery of the cable, said pin being substantially parallel to the longitudinal axis of the cable and being received in a groove of said bracket.

3. In a vehicle having a windshield, an oscillatory drive shaft, a pair of spaced wiper actuating shafts journalled at the lower side of the windshield, a fluted wheel connected to each wiper actuating shaft, and a nonextensible, laterally flexible cable comprising a helically wound wire having adjacent convolutions in engagement with each other, said cable engaging the fluted wheel connected to each wiper actuating shaft and having a driving connection with said oscillatory drive shaft so as to move in a rectilinear reciprocating path to rock said wiper shafts in unison and means for preventing rotation of said cable about its longitudinal axis, said means comprising a bracket secured to one of said shafts, said bracket having a groove therein, and a pin extending substantially parallel to the longitudinal axis of the cable attached to the cable and being received in said groove.

4. Drive apparatus of the character set forth in claim 3 wherein the driving connection between said drive shaft and said cable comprises a third fluted wheel having driving engagement with said cable and operatively connected to said drive shaft.

References Cited in the file of this patent

UNITED STATES PATENTS

| | | |
|---|---|---|
| 1,806,335 | Critchfield | May 19, 1931 |
| 1,812,918 | Aufiero | July 7, 1931 |
| 1,983,962 | Barber et al. | Dec. 11, 1934 |
| 2,511,946 | Sacchini | June 20, 1950 |
| 2,568,922 | Malone | Sept. 25, 1951 |
| 2,599,760 | Hanson | June 10, 1952 |
| 2,602,179 | Biraben | July 8, 1952 |

FOREIGN PATENTS

| | | |
|---|---|---|
| 479,049 | Great Britain | Jan. 31, 1938 |
| 675,432 | Great Britain | July 9, 1952 |
| 149,669 | Australia | Jan. 15, 1953 |
| 1,067,642 | France | Jan. 27, 1954 |